US009000643B2

United States Patent
Kino

(10) Patent No.: US 9,000,643 B2
(45) Date of Patent: Apr. 7, 2015

(54) SEALED ROTATIONAL OUTPUT UNIT AND SEALED MOTOR ASSEMBLY

(75) Inventor: Manabu Kino, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 399 days.

(21) Appl. No.: 13/698,096

(22) PCT Filed: May 12, 2011

(86) PCT No.: PCT/JP2011/002654
§ 371 (c)(1),
(2), (4) Date: Nov. 15, 2012

(87) PCT Pub. No.: WO2011/145302
PCT Pub. Date: Nov. 24, 2011

(65) Prior Publication Data
US 2013/0057116 A1 Mar. 7, 2013

(30) Foreign Application Priority Data

May 21, 2010 (JP) .................................. 2010-117740

(51) Int. Cl.
*H02K 5/124* (2006.01)
*F16J 15/43* (2006.01)
*H02K 5/24* (2006.01)
*H02K 5/173* (2006.01)

(52) U.S. Cl.
CPC .................. *F16J 15/43* (2013.01); *H02K 5/124* (2013.01); *H02K 5/1735* (2013.01)

(58) Field of Classification Search
CPC ........... F16J 15/43; F16J 15/06; H02K 5/124; H02K 5/24; H02K 7/003; H02K 7/08
USPC .................. 384/133, 446, 489; 277/302, 410; 310/40 R, 67 R, 88
See application file for complete search history.

(56) References Cited

U.S. PATENT DOCUMENTS 4,995,622 A * 2/1991 Fuse .............................. 277/410
5,914,548 A * 6/1999 Watanabe et al. ............... 310/88
(Continued)

FOREIGN PATENT DOCUMENTS

JP  S59-51216 U    4/1984
JP  61-160670   *  7/1986  ............... F16J 15/40
(Continued)

OTHER PUBLICATIONS

Rigaku Mechatronics Co., Ltd., "Vacuum seal using magnetic fluid", Internet, Apr. 23, 2010, <URL http://en.rigaku-mechatronics.com/old_products/customize.html> (English translation).*
(Continued)

*Primary Examiner* — Burton Mullins

(57) ABSTRACT

Provided with a sealed rotational output unit (3) which includes a tubular shaft (12) having an outer circumferential surface sealed with a ferrofluidic seal (13); a rotating output shaft (14) disposed inside the tubular shaft (12); and an O-ring (17, 18) that seals between the tubular shaft (12) and the rotating output shaft (14). When the rotating output shaft (14) is directly coupled to a hollow motor shaft (9), shaking thereof is absorbed by the O-ring (17, 18), causing no excessive stress to be produced on the bearing side of the hollow motor shaft (9) or on a bearing (15, 16) side of the ferrofluidic seal (13). Since the tubular shaft (12) rotates in conjunction with the rotating output shaft (14), the O-ring (17, 18) that seals therebetween does not degrade in sealing capability due to wear by sliding. The sealed rotational output unit can be used with high rotational accuracy by directly coupling to a hollow motor (2) without any joint.

7 Claims, 1 Drawing Sheet

(56) References Cited

U.S. PATENT DOCUMENTS

| | | | |
|---|---|---|---|
| 6,119,553 A * | 9/2000 | Yamagishi et al. | 74/640 |
| 7,752,943 B2 * | 7/2010 | Maruyama et al. | 74/640 |
| 8,328,199 B2 * | 12/2012 | Oshita | 277/410 |
| 2012/0018958 A1 * | 1/2012 | Kung | 277/410 |

FOREIGN PATENT DOCUMENTS

| | | |
|---|---|---|
| JP | H07-4964 U | 1/1995 |
| JP | 2002-26105 A | 1/2002 |

OTHER PUBLICATIONS

Rigaku Mechatronics Co., Ltd., "Vacuum seal using magnetic fluid", Internet, Apr. 23, 2010, <URL http://www.rigakumechatronics.com/old_product/custo mize.html>.

Harmonic Drive Systems, Inc., "Direct drive motor kdu", Internet, Apr. 23, 2010, <URL http://hds.co.jp/products/ddm/kdu/index.html>.

International Search Report, Aug. 2, 2011, pp. 1-3.

* cited by examiner

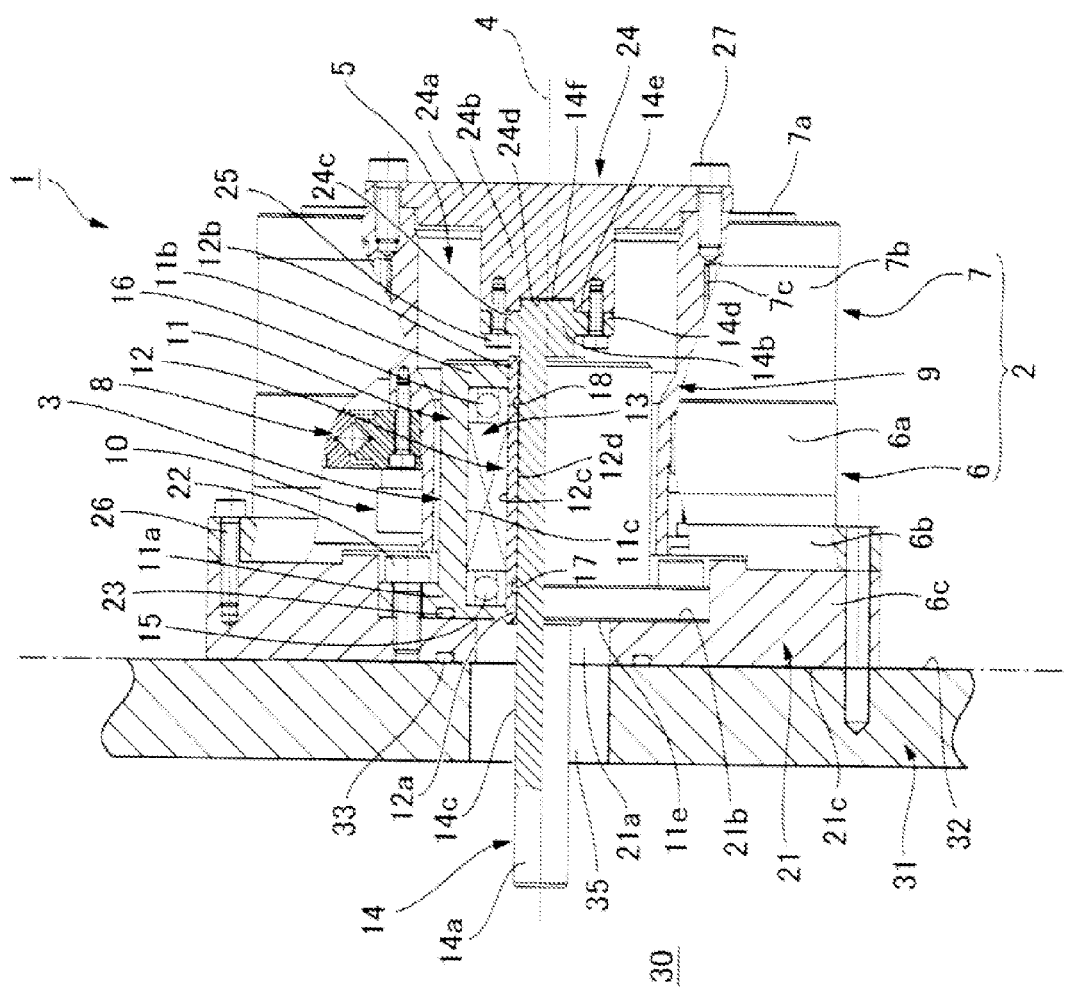

SEALED ROTATIONAL OUTPUT UNIT AND SEALED MOTOR ASSEMBLY

TECHNICAL FIELD

The present invention relates to a sealed rotational output unit used for introducing the rotational output of an AC servo motor or other motor arranged in the atmosphere to an inner compartment that is sealed against the atmosphere, such as a vacuum chamber, a cleanroom, and the like; and a sealed motor assembly mounted with the sealed rotational output unit.

BACKGROUND ART

In the field of semiconductor manufacturing equipment and other fields, various processes are carried out in inner compartments in which a vacuum state or a predetermined reduced-pressure state is maintained. In the case that rotational driving power for processing operations is introduced from a motor arranged in the atmosphere on the outer side of the inner compartment, a shaft that passes through the partition wall of the compartment and extends from the atmosphere side to the vacuum side must be reliably sealed. A contactless magnetic fluid seal is known as such a sealing mechanism.

A magnetic fluid seal and a magnetic sealing unit that has a configuration in which a magnetic fluid seal is incorporated into the AC servo motor appear in Non-patent Document 1. There is a need to modify the specifications for existing AC servo motor flanges and the like and newly redesign such a built-in form of magnetic sealing unit.

In the case that existing AC servo motors are used without modification, e.g., in the case that a hollow-type existing AC servo motor is used without modification as it appears in Non-patent Document 2, there is a need to couple the rotational component of the vacuum side and the motor shaft on the atmosphere side via a coupler having a configuration that is sealed by a magnetic fluid seal. However, in this case, the rotational position of the rotational output shaft cannot be controlled with a high degree of precision due to the twisting and slipping or the like of the coupler.

PRIOR ART DOCUMENTS

Non-Patent Documents

[Non-patent Document 1] "Vacuum seal using magnetic fluid", Rigaku Mechatronics Co., Ltd. (Apr. 23, 2010), Internet <URL http://www.rigakumechatronics.com/old_product/customize.html>

[Non-patent Document 2] "Direct drive motor kdu", Harmonic Drive Systems, Inc. (Apr. 23, 2010). Internet <URL http://hds.co.jp/products/ddm/kdu/index.html>

DISCLOSURE OF THE INVENTION

In view of the foregoing points, an object of the present invention is to provide a sealed rotational output unit suitable for use in coupling with a motor, particularly a hollow-type motor; and a sealed motor assembly having a configuration in which the sealed rotational output unit is coupled and secured to a hollow motor.

To solve the problems described above, a sealed rotational output unit of the present invention is characterized in having:

a tubular unit case;

a tubular shaft arranged in a coaxial state on an inner side of the unit case;

a first bearing and a second bearing that hold the unit case and the tubular shaft in a state that allows free rotation relative to each other, the first and second bearings being arranged between an internal peripheral surface of the unit case and an external peripheral surface of the tubular shaft in a position set at a distance in the axial direction of the unit case and the tubular shaft;

a magnetic fluid seal that holds the space between the unit case and the tubular shaft in an airtight state, the magnetic fluid seal being arranged in a tubular space surrounded by the internal peripheral surface of the unit case, the first bearing, the second bearing, and the external peripheral surface of the tubular shaft;

a rotational output shaft extending in a coaxial state through the hollow part of the tubular shaft; and an elastic seal member that holds the gap between the external peripheral surface of the rotational output shaft and the internal peripheral surface of the tubular shaft in an airtight state.

In the sealed rotational output unit having the above configuration, one shaft end of the rotational output shaft is arranged in a state protruding into, e.g., the vacuum side, and the shaft end on opposite side is fastened and secured to a motor shaft that is arranged on, e.g., the atmosphere side. The rotational output shaft extends through the inner side of the tubular shaft, and the space therebetween is held in an airtight state by the elastic seal member. The tubular shaft is supported in a freely rotating state by the unit case via the first and second bearings, and the space between the tubular shaft and the unit case is held in an airtight state by the magnetic fluid seal.

The rotational output shaft can be secured and fastened directly to the motor shaft. Therefore, unlike cases in which the rotational output shaft is coupled to the motor shaft via a coupler or the like, the rotational positioning precision of the rotational output shaft can be ensured. Even if center runout occurs in the rotational output shaft that is coupled directly to the motor shaft, the center runout of the rotational output shaft is absorbed by the elastic deformation of the elastic seal member that seals the space between the rotational output shaft and the tubular shaft. Consequently, excess stress acts on the motor shaft bearing side or on the first and second bearings side supporting the tubular shaft that passes through the rotational output shaft, excessively wearing down the bearing portions; and a reduction in service life or other adverse effects do not occur.

Also, the tubular shaft rotates in accompaniment with the rotational output shaft, and the elastic seal member which seals the gap therebetween also rotates in accompaniment with the tubular shaft and the rotational output shaft, because the tubular shaft is supported in a freely rotating state by the first and second bearings. Consequently, a sealed state formed by the elastic seal member can be ensured while a reduction in the service life of the elastic seal member due to sliding abrasion can be simultaneously prevented because wear due to sliding friction on the elastic seal member does not occur.

An O-ring can be used here as the elastic seal member.

Also, in addition to the above-described configuration, the sealed rotational output unit of the present invention is characterized in comprising: a disc-shaped distal end flange that is fastened and secured to the distal end part in the axial direction in the unit case; and a joined-interface sealed member that holds the space between the mutually joint faces of the unit case and the distal end flange in an airtight state, wherein the distal end flange is provided with a flange shaft hole through which the distal end part of the rotational output shaft extends.

In the sealed rotational output unit having the above configuration, the flange shaft hole is positioned in a shaft hole formed in a partition wall that partitions, e.g., a vacuum chamber from the atmosphere side, and the distal end flange of the unit case is installed in this state on the side surface of the partition wall on the atmosphere side. In a state in which the sealed rotational output unit is installed in the partition wall, the space between the vacuum side and the atmosphere side is reliably sealed by the elastic seal member, the magnetic fluid seal, and the joined-interface seal.

Next, in addition to the above-described configuration, the sealed rotational output unit of the present invention is characterized in comprising a rear end flange fastened and secured in a coaxial state to a shaft rear end part of the rotational output shaft, wherein the fastened and secured position of the rotational output shaft and the rear end flange can be shifted by a predetermined distance in a direction orthogonal to the axial direction.

The fastened and secured position of the rotational output shaft of the sealed rotational output unit and the rear end flange that is fastened and secured in a coaxial state to the motor shaft is minutely adjusted in a direction orthogonal to the axial direction, whereby the rotational output shaft can be coupled to the motor shaft in a state without misalignment, and center runout of the rotational output shaft can be reliably prevented.

Next, a sealed motor assembly of the present invention is characterized in comprising:

a hollow motor formed on a center thereof with a hollow part extending therethrough along an axial direction of the hollow motor; and a sealed rotational output unit having the above configuration, arranged in a coaxial state in the hollow part, wherein the unit case of the sealed rotational output unit is fastened and secured to the motor case of the hollow motor, and the rotational output shaft of the sealed rotational output unit is fastened and secured in a coaxial state to the hollow motor shaft supported in a freely rotating state by the motor case of the hollow motor.

The sealed motor assembly can be constructed without incurring an increase in size because the sealed rotational output unit provided with the magnetic fluid seal is arranged using the hollow part of the hollow motor. Also, unlike cases of coupling via a coupler, a reduction in the rotational positioning precision can be prevented because the rotational output shaft is coupled directly to the hollow motor shaft.

Here, the sealed rotational output unit may have: a disc-shaped distal end flange that is fastened and secured to the distal end part in the axial direction in the unit case; and a joined-interface seal member that holds the space between mutually joined faces of the unit case and the distal end flange in an airtight state, wherein the distal end flange is provided with a flange shaft hole through which the shaft distal end part of the rotational output shaft extends. In this case, the distal end flange is fastened and secured to the motor case of the hollow motor.

Also, the sealed rotational output unit may have a rear end flange that is fastened and secured in a coaxial state to a shaft rear end part of the rotational output shaft, wherein the fastened and secured position of the rotational output shaft and the rear end flange can be shifted by a predetermined distance in a direction orthogonal to the axis. In this case, the rear end flange is fastened and secured in a coaxial state to the hollow motor shaft of the hollow motor.

Furthermore, the motor case of the hollow motor may have: a fixed-side motor case positioned on the distal end side in the axial direction thereof; and a rotation-side motor case positioned on the rear end side thereof, wherein the rotation-side motor case is integrally formed with or coupled and secured to the hollow motor shaft, and the hollow motor shaft is supported in a freely rotating state by the fixed-side motor case. In this case, the distal end flange of the sealed rotational output unit is fastened and secured to the fixed-side motor case, and the rear end flange of the sealed rotational output unit is fastened and secured to the rotational-side motor case.

Effect of the Invention

In the present invention, the rotational output shaft is arranged in a state that passes through the interior of the tubular shaft in which the external peripheral surface is sealed with the magnetic fluid seal, and the space between the tubular shaft and the rotational output shaft is sealed by an O-ring or other elastic seal member. According to this configuration, when the rotational output shaft is directly connected to the motor shaft, runout is absorbed by the elastic seal member, and excess stress is not generated on the bearing side of the motor shaft or the bearing side of the magnetic fluid seal. Also, the elastic seal that seals the space between the tubular shaft and the rotational output shaft is not worn by sliding and sealing characteristics are not reduced because the tubular shaft rotates in accompaniment with the rotational output shaft. Therefore, according to the present invention, it is possible to achieve a sealed rotational output unit having a high rotational precision to which a motor, e.g., an existing motor can be directly connected and used without the use of a coupler. A sealed motor assembly can be achieved without incurring an increase in size because the sealed rotational output unit provided with a magnetic fluid seal is arranged in the hollow part of the hollow motor.

BRIEF DESCRIPTION OF THE DRAWINGS

FIG. 1 is a schematic configuration view showing a sealed motor assembly according to the present invention, in which one part is shown in a longitudinal section and the remaining parts is shown in a side view.

MODE FOR CARRYING OUT THE INVENTION

An embodiment of the sealed motor assembly in which the present invention has been applied is described below with reference to the drawing.

Referring to FIG. 1, a sealed motor assembly 1 of the present embodiment is provided with a hollow motor 2 and a sealed rotational output unit 3. A hollow part 5 extending in the direction of a motor shaft axis 4 is extended through the center part of the hollow motor 2, and the sealed rotational output unit 3 is mounted coaxially therein.

The hollow motor 2 is constituted from a fixed part 6 on the distal end side and a rotational part 7 on the rear end side. The fixed part 6 has a configuration in which a tubular fixed-side motor case 6a, a tubular encoder cover 6b, and a tubular mounting flange 6c are assembled coaxially from the rear end side. The rotational part 7 is provided with a hollow motor shaft 9 which extends along the center of the fixed part 6 and the rotational part 7. A disc-shaped rear end-side end plate 7a which extends outward in the radial direction is integrally formed on the rear end part of the hollow motor shaft 9. A tubular rotation-side motor case 7b which extends to the distal end side is integrally formed on the external peripheral edge part of the rear end-side end plate 7a. A motor case for the hollow motor 2 is constituted by the fixed-side motor case 6a and rotation-side motor case 7b.

A stator core secured to the inner side of the fixed-side motor case 6a and a stator part (not shown) composed of a drive coil wound around the stator core are arranged in the tubular space between the rotation-side motor case 7b and the hollow motor shaft 9, and the stator part faces a rotor magnet 7c coaxially secured to the external periphery of the hollow motor shaft 9 via a fixed gap. Also, the fixed part 6 and the rotational part 7 are held by a cross roller bearing 8 arranged therebetween so that the two parts can rotate relative to each other. An encoder unit 10 is incorporated in the external peripheral portion of the hollow motor shaft 9, which is covered by the encoder cover 6b, and the rotational position of the hollow motor shaft 9 can be detected.

(Sealed Rotational Output Unit)

Next, the sealed rotational output unit 3 is provided with a tubular unit case 11. An annular distal end-side end plate 11a which extends both inward and outward in the radial direction is integrally formed on the distal end part of the unit case 11. An annular rear end-side end plate 11b which extends inward in the radial direction is integrally formed on the rear end part of the unit case 11.

A tubular shaft 12 is arranged in a coaxial state on the inner side of the unit case 11 having the above-described shape, a shaft distal end part 12a of the tubular shaft 12 protrudes slightly from the distal end-side end plate 11a to the distal end side, and a very small annular gap is formed between the external peripheral surface portion of the shaft distal end part 12a and the circular internal peripheral surface of the distal end-side end plate 11a. A shaft rear end part 12b of the tubular shaft 12 likewise protrudes slightly from the rear end-side end plate 11b in the rear end direction, and a very small circular gap is formed between the external peripheral surface portion of the shaft rear end part 12b and the circular internal peripheral surface of the rear end-side end plate 11b.

A distal end-side bearing 15 and a rear end-side bearing 16 are incorporated in the inner side of the unit case 11 on the rear-side position of the distal end-side end plate 11a and on the front-side position of the rear end-side end plate 11b, and the tubular shaft 12 is maintained in a freely rotating state relative to the circular internal peripheral surface 11c via the bearings 15 and 16.

A magnetic fluid seal 13 is mounted in a tubular space surrounded by the circular internal peripheral surface 11c of the unit case 11, the bearings 15 and 16, and a circular external peripheral surface 12c of the tubular shaft 12. The magnetic fluid seal 13 has a configuration in which permanent magnet rings and magnetic rings are stacked and arrayed in alternating order in the axis direction of the tubular shaft, and a magnetic fluid is held by magnetic force between the internal peripheral surface of the magnetic rings and the circular external peripheral surface 12c of the tubular shaft 12, which is composed of magnetic material. The structure of the magnetic fluid seal 13 is well known and is omitted from the drawing. The space between the tubular shaft 12 and the unit case 11 is held in an airtight state by the magnetic fluid seal 13.

A rotational output shaft 14 extends in a coaxial state through the hollow part of the tubular shaft 12. An annular or tubular gap is formed between a circular internal peripheral surface 12d of the tubular shaft 12 and a circular external peripheral surface 14c of the rotational output shaft 14. Also, annular grooves having a rectangular cross section are formed in a position facing the distal end-side bearing 15 and a position facing the rear end-side bearing 16 in the circular internal peripheral surface 12d of the tubular shaft 12, and O-rings 17 and 18 are mounted as elastic seal components in the annular grooves. The O-rings 17 and 18 keep the gap between the circular internal peripheral surface 12d of the tubular shaft 12 and the circular external peripheral surface 14c of the rotating output shaft 14 in an airtight state by being in an elastically deformed and flattened state. Depending on the situation, a seal ring made of resin or rubber that can elastically deform can be used in place of the O-rings 17, 18.

Next, a disc-shaped distal end flange 21 is fastened and secured in a coaxial state to a distal end-side end surface 11e on the distal end-side end plate 11a of the unit case 11 using fastening bolts 22. A flange shaft hole 21a which is formed in the center of the distal end flange 21, is shaped such that the distal end side has a small-diameter aperture, and the rear end side has a large-diameter aperture. The distal end-side end plate 11a is mounted from the rear side to the large-diameter aperture portion and is fastened and secured thereto by the fastening bolts 22. The space between an annular step surface 21b of the flange shaft hole 21a and the distal end-side end surface 11e of the distal end-side end plate 11a connected thereto is held in an airtight state by an O-ring 23. A shaft distal end part 14a of the rotational output shaft 14 protrudes toward the distal end side through the flange shaft hole 21a of the distal end flange 21.

On the other hand, a disc-shaped rear end flange 24 is fastened and secured in a coaxial state to a shaft rear end part 14b of the rotational output shaft 14 by fastening bolts 25. A disc-shaped boss 14d having a large diameter is formed on the shaft rear end part 14b of the rotational output shaft 14, and a columnar convex part 14f protrudes rearward from the center of a rear end surface 14e of the boss 14d. In contrast, the rear end flange 24 is provided with a disc-shaped portion 24a having a large diameter and a columnar boss 24b that protrudes to the distal end side from the center of the end surface of distal end side of the disc-shaped portion 24a. The boss 24b has the same diameter as the boss 14d, and a round concave part 24d is formed at the center of the rear end surface 24c.

The rear end surface 14e of the boss 14d of the rotational output shaft 14 and the distal end surface 24c of the boss 24b of the rear end flange 24 are matching surfaces for positioning when the rotational output shaft 14 and the rear end flange 24 are coupled together. Also, the inside diameter of the round concave part 24d is slightly greater than the outside diameter of the boss 14d, and there is play therebetween. The rotational output shaft 14 and the rear end flange 24 can move slightly in a relative fashion in the direction orthogonal to the axes thereof.

Here, in the sealed rotational output unit 3 the disc-shaped distal end flange 21 is fastened and secured from the distal end in relation to the mounting flange 6c of the fixed part 6 of the hollow motor 2 using fastening bolts 26. Also, the disc-shaped portion 24a of the rear end flange 24 is fastened and secured to the rear end part of the hollow motor shaft 9 of the hollow motor 2 using fastening bolts 27.

In the sealed motor assembly 1 with this configuration, the distal end surface 21c of the distal end flange 21 is fastened and secured, e.g., to an atmosphere-side flank 32 of the partition wall 31 on the atmosphere side of the vacuum chamber 30 by using fastening bolts (not shown). An elastic seal material, e.g., an O-ring 33 is mounted between the atmosphere-side flank 32 of the partition wall 31 and the distal end surface 21c of the distal end flange 21, and the space therebetween is held in an airtight state. The shaft distal end part 14a of the rotational output shaft 14 is in a state protruding to the vacuum chamber side through a shaft hole 35 in the partition wall 31. In this state, a sealed state is formed between the vacuum side and the atmosphere side by the O-ring 33, the O-ring 23 of the sealed rotational output unit 3, the magnetic fluid seal 13, and O-rings 17 and 18.

In the sealed motor assembly 1 according to the present embodiment, the space between the unit case 11 on the secured side and the tubular shaft 12 on the rotating side is sealed using the magnetic fluid seal 13. Frictional force accompanying the rotation of the rotational output shaft 14 by the hollow motor 2 can be reduced because the non-contact magnetic fluid seal 13 is used. Also, the distal end flange 21 in the sealed rotational output unit 3, and the portion outside the rear end flange 24, i.e., the portion in which the magnetic fluid seal 13 is formed are arranged inside the hollow part 5 of the hollow motor 2. Consequently, the sealed rotational output unit 3 can be installed without considerable accompanying increase in the shaft length or outer diameter of the existing hollow motor 2. Therefore, the small-sized, compact sealed motor assembly 1 can be implemented.

Also, twisting, slipping, and the like between components of the shafts do not occur because the rotational output shaft 14 is fastened and secured to the hollow motor shaft 9 without a coupler. Therefore, the precision of rotational positioning of the rotational output shaft 14 can be ensured.

There is an annular gap between the tubular shaft 12, which is the rotational shaft of the magnetic fluid seal 13, and the rotational output shaft 14 on the inner side thereof. The annular gap is sealed by O-rings 17 and 18 arranged at the front and rear. Because the tubular shaft 12 and the rotational output shaft 14 rotate in accompaniment with each other, the O-rings 17 and 18 therebetween do not undergo sliding abrasion, and a reliable sealed state is maintained.

Even if misalignment occurs between the tubular shaft 12 and the rotational output shaft 14, the misalignment is absorbed by the elastic deformation of the O-rings 17 and 18 arranged therebetween.

On the other hand, the rotational output shaft 14 and the hollow motor shaft 9 are fastened and secured via the rear end flange 24. The rotational output shaft 14 and the rear end flange 24 are assembled with good precision at right angles using mutual matching surfaces (14e, 24c) that are formed with good precision. Also, since the rear end flange 24 can move in the direction slightly orthogonal to the axis in relation to the rotational output shaft 14, the rotational output shaft 14 can be fastened and secured in a state without misalignment in relation to the hollow motor shaft 9 via the rear end flange 24. Therefore, excess stress caused by misalignment between the rotational output shaft 14 and the hollow motor shaft 9 is generated in the bearings 15, 16 of the magnetic fluid seal 13 or the bearings (not shown) of the hollow motor 2, and a reduction in the service life thereof, and other adverse effects can be avoided.

In the above-described hollow motor 2, the motor case is constituted from the fixed-side motor case 6a and the rotation-side motor case 7b, but it is possible to use a hollow motor having a general configuration in which a hollow motor shaft is arranged in a coaxial state and freely rotating state inside a single tubular motor case. In this case, the unit case 11 can be directly or indirectly fastened and secured to the fixed-side motor case, and the rotational output shaft 14 can be directly or indirectly fastened and secured to the hollow motor shaft.

The invention claimed is:

1. A sealed rotational output unit (3) having:
    a tubular unit case (11);
    a tubular shaft (12) arranged in a coaxial state on an inner side of the unit case (11);
    a first bearing (15) and a second bearing (16) that hold the unit case (11) and the tubular shaft (12) in a state that allows free rotation relative to each other, the first and second bearings (15, 16) being arranged between an internal peripheral surface (11c) of the unit case (11) and an external peripheral surface (12c) of the tubular shaft (12) in a position set at a distance in an axial direction of the unit case and the tubular shaft;
    a magnetic fluid seal (13) that holds a space between the unit case (11) and the tubular shaft (12) in an airtight state, the magnetic fluid seal being arranged in a tubular space surrounded by the internal peripheral surface (11c) of the unit case (11), the first bearing (15), the second bearing (16), and the external peripheral surface (12c) of the tubular shaft (12);
    a rotational output shaft (14) extending in a coaxial state through a hollow part of the tubular shaft (12); and
    a fine annular gap formed between the external peripheral surface (14c) of the rotational output shaft (14) and an internal peripheral surface (12d) of the tubular shaft (12);
    an elastic seal member (17, 18) that is disposed in the fine annular gap to hold the fine annular gap in an airtight state, so that misalignment between the rotational output shaft (14) and the tubular shaft (12) is absorbed by elastic deformation of the elastic seal membrane (17, 18); and
    a rear end flange (24) fastened and secured in a coaxial state to a shaft rear end part (14b) of the rotational output shaft (14), wherein
    the shaft rear end part (14b) of the rotational output shaft (14) has a rear end surface (14e), and the rear end flange (24) has a distal end surface (24c), the rear end surface (14e) and the distal end surface (24c) being matching surfaces for positioning when the rotational output shaft (14) and the rear end flange (24) are coupled together, and wherein
    a fastened and secured position of the rotational output shaft (14) and the rear end flange (24) can be shifted along the matching surfaces (14e, 24c) by a predetermined distance in a direction orthogonal to the axial direction.

2. The sealed rotational unit (3) according to claim 1, wherein the elastic seal member is an O-ring (17, 18).

3. The sealed rotational unit (3) according to claim 1, comprising:
    a disc-shaped distal end flange (21) that is fastened and secured to a distal end part in the axial direction in the unit case (11); and
    a joined-interface sealed member (23) that holds a space between mutually joint faces (11e, 21b) of the unit case (11) and the distal end flange (21) in an airtight state, wherein
    the distal end flange (21) has a flange shaft hole (21a) through which a distal end part (14a) of the rotational output shaft (14) extends.

4. A sealed motor assembly (1) comprising:
    a hollow motor (2) formed on a center thereof with a hollow part (5) extending therethrough along an axial direction of the hollow motor; and
    the sealed rotational output unit (3) according to claim 1, arranged in a coaxial state in the hollow part (5), wherein
    the unit case (11) of the sealed rotational output unit (3) is fastened and secured to a motor case of the hollow motor (2), and
    the rotational output shaft (14) of the sealed rotational output unit (3) is fastened and secured in a coaxial state, via the rear end flange (24), to the hollow motor shaft (9) supported in a freely rotating state by the motor case of the hollow motor (2).

5. The sealed motor assembly (1) according to claim 4, wherein
the sealed rotational output unit (3) has:
a disc-shaped distal end flange (21) that is fastened and secured to a distal end part in the axial direction in the unit case (11); and
a joined-interface seal member (23) that holds a space between mutually joined faces (11*e*, 21*b*) of the unit case (11) and the distal end flange (21) in an airtight state, wherein
the distal end flange (21) has a flange shaft hole (21*a*) through which a shaft distal end part (14*a*) of the rotational output shaft (14) extends, and wherein
the distal end flange (21) is fastened and secured to a motor case of the hollow motor (2).

6. The sealed motor assembly (1) according to claim 5, wherein
the motor case of the hollow motor (2) has a fixed-side motor case (6*a*) positioned on a distal end side in the axial direction thereof, and a rotation-side motor case (7*b*) positioned on a rear end side thereof, the rotation-side motor case (7*b*) being integrally formed with or coupled and secured to the hollow motor shaft (9),
the hollow motor shaft (9) is supported in a freely rotating state by the fixed-side motor case (6*a*),
the distal end flange (21) of the sealed rotational output unit (3) is fastened and secured to the fixed-side motor case (6*a*), and
the rear end flange (24) of the sealed rotational output unit (3) is fastened and secured to the rotational-side motor case (7*b*).

7. The sealed motor assembly (1) according to claim 4, wherein the elastic seal member of the sealed rotational output unit (3) is an O-ring (17, 18).

\* \* \* \* \*